UNITED STATES PATENT OFFICE.

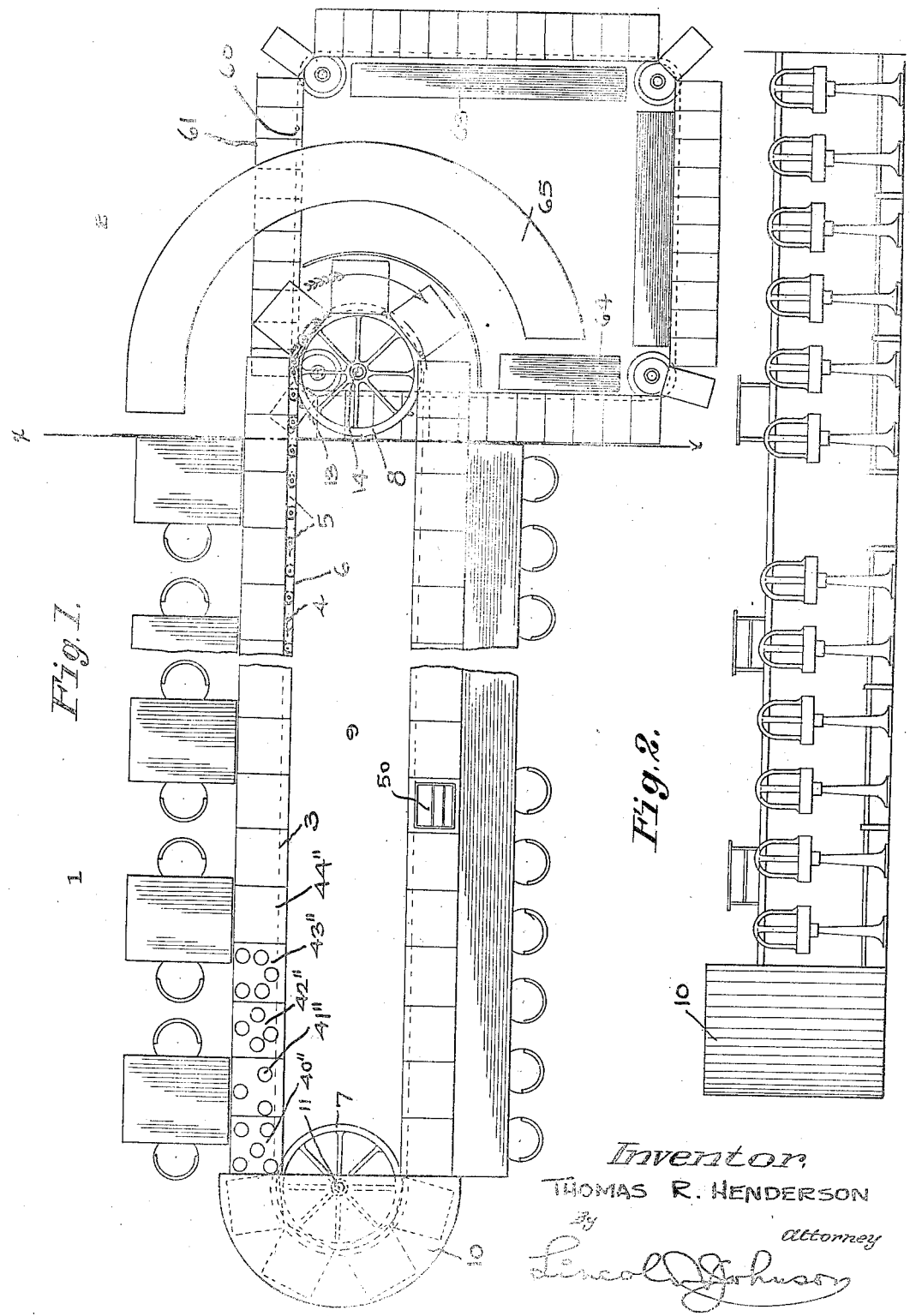

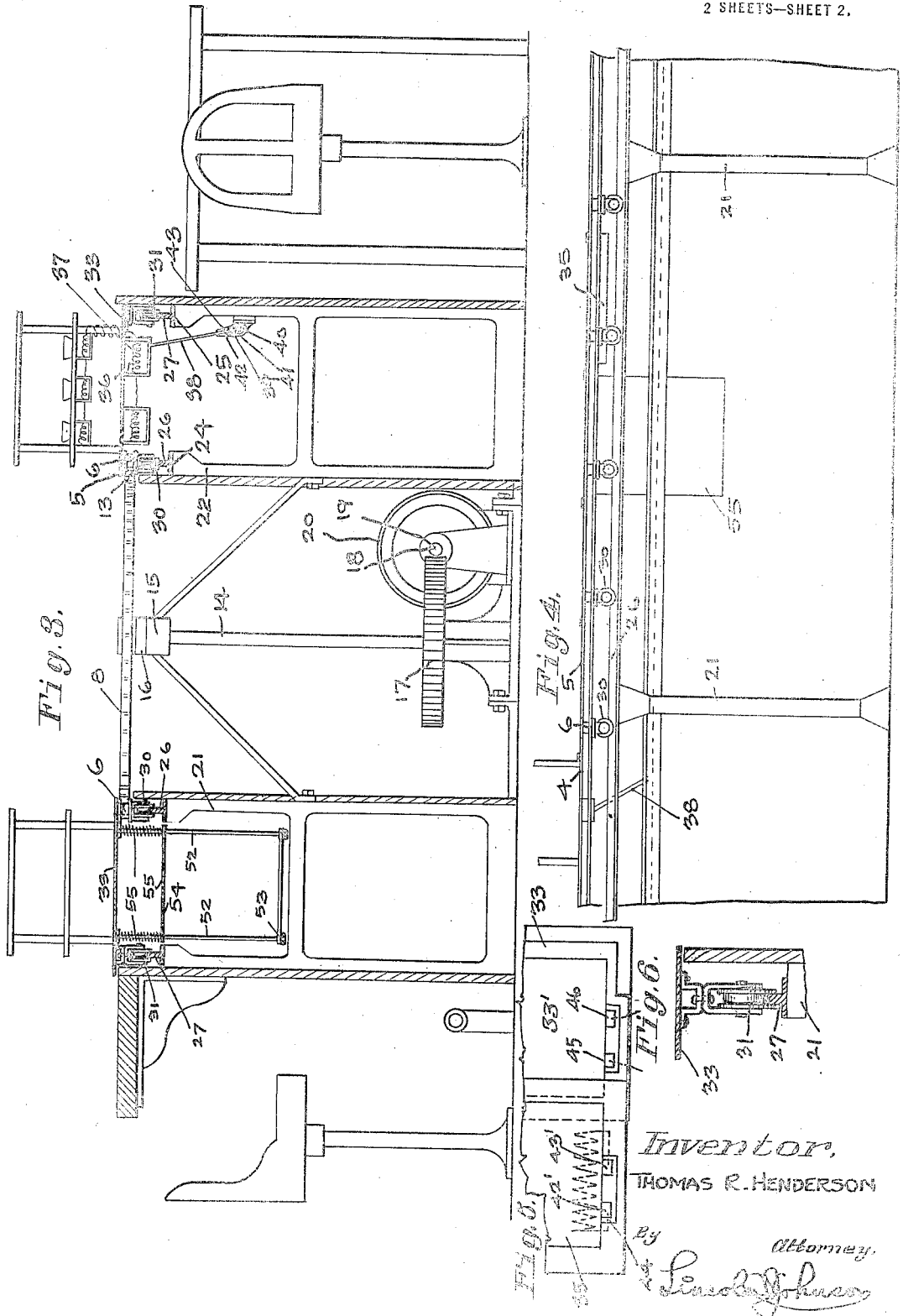

THOMAS R. HENDERSON, OF SAN FRANCISCO, CALIFORNIA.

CONVEYER DISPENSING SYSTEM.

1,411,432.   Specification of Letters Patent.   Patented Apr. 4, 1922.

Application filed September 9, 1920. Serial No. 409,126.

*To all whom it may concern:*

Be it known that I, THOMAS R. HENDERSON, a citizen of the United States, and a resident of the city and county of San Francisco, State of California, have made a new and useful invention—to wit, Improvements in Conveyer Dispensing Systems; and I do hereby declare the following to be a full, clear, concise, and exact description of the same.

This invention relates particularly to a conveyer adapted to move on a predetermined course and having devices thereon for containing food products, dishes or other articles so arranged that a person or persons seated at various stationary points, relative to said conveyer, will be able to withdraw articles from the conveyer onto a contiguous counter. The automatic conveyer dispensing system has been designed to render more prompt and efficient service to the public and afford greater convenience to the patrons, also to reduce operating expense of the establishment installing it. The idea is based on reversing the present method practiced by the average cafeteria in that the food is brought to the customer instead of the customer carrying it. This system is a traveling conveyer so designed and constructed as to convey food of any kind either hot or cold, to the counter or table at which the customer is seated.

The principal object of this invention is to provide suitable tables or counters, by which the container conveyer moves enabling a person seated at said counters or tables adjacent the conveyer to remove desired articles from the same.

A further object is to provide a companion conveying system operable in unison with the first mentioned conveyer whereby soiled dishes, refuse and the like may be removed from the various counters and tables without requiring any human agency to transport the same.

A still further object is to provide trays on the conveyer system of a construction particularly adapted to my invention for containing food stuffs or other articles desired kept in a heated condition, having means in said tray connected with a relatively stationary element, that may be either intermittently supplied with a heating medium at certain designated points or continually connected with a heating element.

Another object of the invention is to provide an independent conveyer system for receiving soiled dishes or other refuse from the main conveyer and advancing the same to a cleansing station or for advancing new trays of food, clean dishes and the like to an initial filling station of the main conveyer. Other objects and advantages will appear as this description progresses.

In this specification and the accompanying drawings, the invention is illustrated in the form considered to be the best, but it is to be understood that the invention is not limited to such form, because it may be embodied in other forms, and it is also to be understood that in and by the claims following the description it is desired to cover the invention in whatsoever form it may be embodied.

In the accompanying two sheets of drawings,

Figure 1 represents a plan view of a conveyer dispensing system constructed in accordance with my invention.

Figure 2 represents a side elevation of Figure 1.

Figure 3 is an enlarged sectional elevation through Figure 1 on the line X—X.

Figure 4 is an enlarged sectional side elevation of the conveyer system as illustrated in Figure 2.

Figure 5 is a sectional plan view showing the electrical contact means for heating the trays mounted on the carrier frame.

Figure 6 is an enlarged end view of a pivotal caster roller secured to the tray frames.

In detail the construction illustrated in the drawing includes a compartment having a partition X—X therein dividing the same into a dining room 1 or other suitable pavilion and a kitchen or preparing department 2. The main conveyer dispensing system generally designated by the numeral 3 consists of a series of frames or plates 33 all similar and successively articulated to one another and mounted at one side upon the continuous chain belt, consisting of link sections 4 and 5 joined together by pivot pins 6, which in turn (or the pivot pins) is engaged by sprockets 7 and 8 of a suitable diameter to provide an aisle 9 of any desired width between the opposite sides of the conveyer. The sprocket 7, or other suitable means for holding and spacing the articulated conveyer to give it the necessary turning radius, is mounted in the dining room and provided with a suitable enclosing cover 10, encasing the end thereof, for the purpose of protecting patrons from injury if accidentally coming too close to the moving conveyer. As shown in Figure 1, the sprocket 7 is mounted upon a suitable shaft 11 and is freely revoluble therearound. The opposite sprocket 8 is provided with suitable peripheral teeth 13 at various points on the periphery thereof adapted to lodge against the pintle pins 6 to thus impart motion to the conveyer. The sprocket 8 is mounted upon the shaft 14 rotatably fixed in the guide collar 15 and bearing 16, having the worm wheel 17, keyed or otherwise secured thereon, and meshing with the worm 18 mounted on the shaft 19 of the motor 20. The motive means thus described is one form of mechanism suitable to applicant's construction for moving the conveyer system although I am aware that other forms and mechanisms would function to serve the same purpose and achieve the same result and I do not desire to limit myself to the particular form shown.

The aisle 9 within which the attendants move about is bordered on both sides with the conveyer supports 21, said supports having the inner and outer sides thereof covered with wood, sheeting or other suitable enclosing material adaptable to give a desired finish. The conveyer supports 21 are spaced at various intervals around the counter beneath the articulated conveyer and have the upper ends thereof surfaced at 24 and 25 to receive the T-shaped rails 26 and 27. The rails 26 and 27 form guide tracks for the castor rollers 30 and 31 pivotally secured, respectively, to the underside of the link pins 6 in the conveyer chain and the tray supporting frames or plates 33 which have a side thereof attached to the conveyer chain. Thus the tray supporting frames or plates secured on alternate links of the conveyer chain are enabled to pass around the periphery of the sprocket wheels without the contents of one tray frame or plate interfering with the contents of the next adjacent tray frame or plate. The castor rollers 30 and 31 as previously described are mounted respectively on the under side of the pins of the conveyer chain and on the under side of the tray supporting frames or plates, so as to freely swivel thereon in an obvious manner for the purpose of permitting the tray supporting frames or plates to pass around the carrying guide tracks contiguous to the end sprocket members.

The tray supporting frames or plates are preferably provided with a central opening into which containers or other articles may be placed and removed at any particular place that the conveyer happens to be. The containers 35 are of the usual pan type having a depressed center portion and a beaded or flanged edge that is adapted to rest upon the upper faces of the supporting frame around the edge thereof.

Certain of the pans carried in the tray frames used for containing heated dishes or articles, such as illustrated at 36, are provided with electrical heating coils 37 supplied with current through the trolley pole 38, having the harp 39 thereon contacting with the power cable 40, carried in a suitable conduit 41, secured within the supports 21. The trolley member 38 is adapted to pass through a suitable slot in the conduit member, and to prevent sparks or other electrical disturbances from having a dangerous effect on the surrounding enclosing material, is provided with insulating, enclosing members 42 and 43 on both sides of the conduit slot that are adapted to snugly engage around the trolley arm.

The pans having the heating coils therein, as illustrated by the detail in Figure 5, are provided with the terminal members 42' and 43', embedded in suitable insulation 44, and connecting with the ends of the heating coil. These terminals are adapted to contact with companion terminals 45 and 46 provided in the tray frame or plate 33 and connecting with the source of power supply when the feed pans or containers are slid or placed onto the frames or plates 33. Thus the pan for containing heated articles can be positioned in its frame and by registry of the companion terminals 42'—43' and 45—46 heating current will be supplied to or disconnected from the respective coils automatically with the pan moving into and being removed from its frame. Adjacent the outer edges of the conveyer trays a plurality of tables and chairs, or counters and chairs, are provided, at which patrons may seat themselves and withdraw desired articles from the pans or trays mounted on the conveyer system. Thus tray 40" would be filled with bowls of soup, tray 41" with salads or relishes, tray 42" with fish, entrées, meats or the like, tray 43" with desserts, cakes, etc., tray 44" with hot coffee, milk or other drinks and the sequence of trays continued around the full length of the conveyer. When any patron has finished a meal, attendants in the center aisle 9 would give suitable debit checks or receive payment for the food consumed. The dirty dishes, refuse and the like would then be placed on suitable trays and passed through the opening 50 onto the auxiliary conveyer 55, operable in unison with the main conveyer, consisting of rod members 52 secured to the under side of the main conveyer 33 and having nuts 53 on the ends thereof for limiting the downward movement of the carrying member 54 slidably guided on said rods 52. The member 54 is slidably mounted on the rods 52 and by means of coiled springs 55, wrapper around the rods 52 and having the ends thereof secured respectively to the under side of the tray and to the upper surface of the refuse carrying member 55, the position thereof on the support rods 52 varying according to the weight of dishes, refuse and the like that is placed thereon. The refuse carrying members are preferably placed continuously about the under side of the main conveyer system although it would be clearly within the purview of this invention to secure the same at intermittent intervals or to provide an independent conveyer system, (not shown), operable in unison with the main conveyer.

The soiled dishes on the lower carrying member 54 that pass through the partition X—X into the kitchen are removed therefrom by an attendant and placed upon an independent conveyer, consisting of an articulated link chain section 60 and trays 61, on which they pass in a predetermined course to a cleansing station 63 where they are removed and washed and replaced on the conveyer. They then move to a supply station 64 where they are held in reserve for use. The table 65 is used for the purpose of preparing different foods and other articles prior to placing them into pans or trays on the main conveyer 3. The kitchen conveyer system is constructed substantially in the same manner as the main conveyer and it is understood that the shape and prescribed course of the same is not to be limited to the illustration shown in Figure 1.

Having thus described this invention, what I claim and desire to secure by Letters Patent is:

1. A dispensing system such as described comprising an articulated conveyer, adapted to have containers thereon; means for moving said conveyer through a predetermined course; a platform contiguous to said conveyer whereby articles may be removed from the conveyer onto said platform and an auxiliary conveyer mounted on the underside of said first mentioned conveyer.

2. A dispensing system such as described comprising a conveyer composed of a series of plates all similar and successively articulated to one another and mounted at one side upon a continuous chain belt; sprocket wheels for moving said chain belt through a predetermined course; a platform contiguous to said conveyer whereby articles may be removed from said conveyer onto said platform; and an auxiliary conveying means mounted beneath said first mentioned conveyer and operated in unison therewith.

3. A dispensing system such as described comprising a conveyer composed of a series of plates adapted to have containers mounted thereon; an articulated chain belt secured at one side to each of said plates; means for moving said chain belt through a predetermined course; means for supplying said plates and containers with a heating medium; a platform contiguous to said conveyer whereby articles may be removed from said conveyer onto said platform.

4. A dispensing system such as described comprising a conveyer composed of a series of plates adapted to have containers mounted thereon; an articulated chain belt secured at one side to each of said plates; means for moving said chain belt through a predetermined course and casters swivelly mounted on the undersides of said plates on the ends thereof opposite said chain belt for supporting the same in operative position.

5. A conveyer system such as described comprising a series of plates adapted to have containers mounted thereon; an articulated chain belt secured to said plates on one side thereof; sprocket wheels for maintaining said chain belt in predetermined relation; means for moving said belt by rotation of one of said sprocket wheels; guide tracks mounted beneath said series of plates and casters swivelly mounted on the underface of said chain belt and plates and engaging said guide tracks for supporting said conveyer in operative position.

6. A conveyer system such as described comprising a series of plates adapted to have containers mounted thereon; means for heating said containers on said plates; an articulated chain belt secured to said plates on one side thereof; sprocket wheels for maintaining said chain belt in predetermined relation; means for moving said belt by rotation of one of said sprocket wheels; guide tracks mounted beneath said series of plates and casters swivelly mounted on the under face of said chain belt and plates and engaging said guide tracks for supporting said conveyer in operative position.

7. A conveyer system such as described comprising a series of plates adapted to have containers mounted thereon; an articulated chain belt secured to said plates on one side thereof; sprocket wheels for maintaining said chain belt in predetermined relation; means for moving said belt by rotation of one of said sprocket wheels; guide tracks mounted beneath said series of plates and casters swivelly mounted on the under face of said chain belt and plates and engaging said guide tracks for supporting said conveyer in operative position and means for supplying certain of said containers with a heating medium from a relatively stationary source.

In testimony whereof, I have hereunto set my hand at San Francisco, California, this 19th day of August, 1920.

THOMAS R. HENDERSON.

In presence of—
LINCOLN V. JOHNSON.